March 20, 1951  A. A. MICKALEK  2,545,967
HOG WATERING TROUGH
Filed Jan. 6, 1949
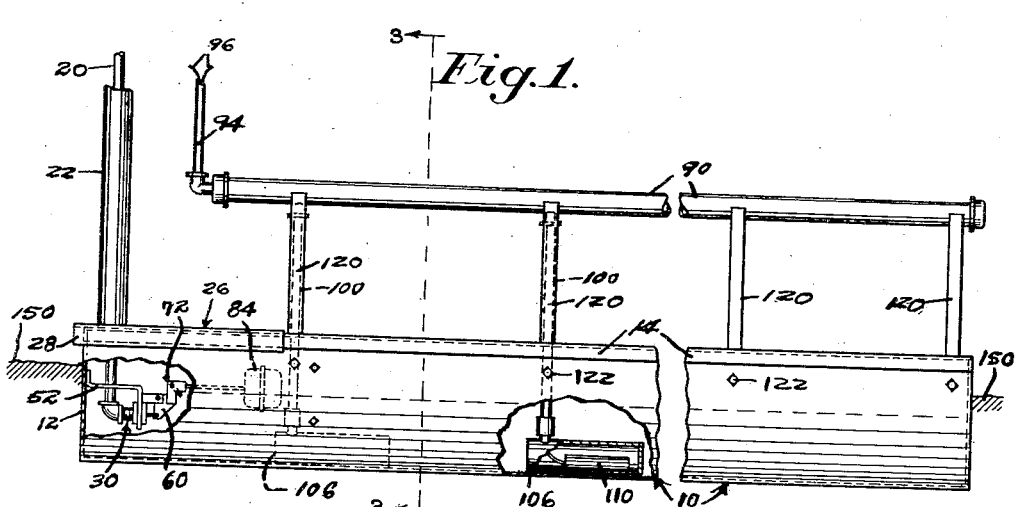
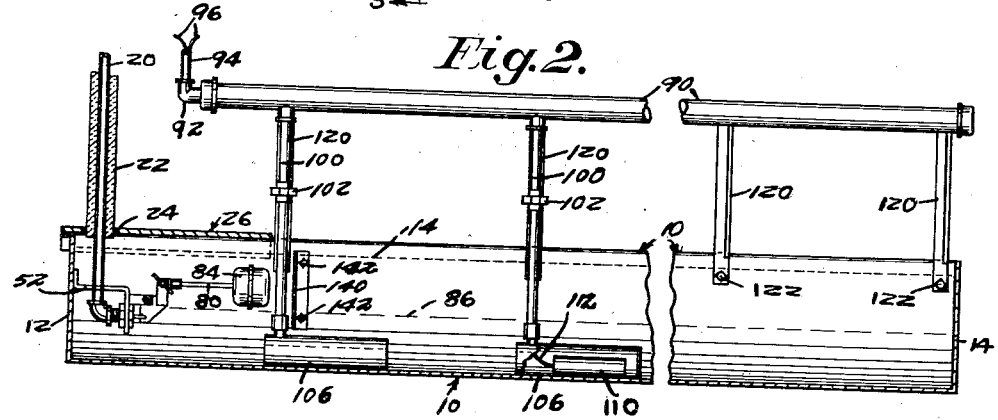
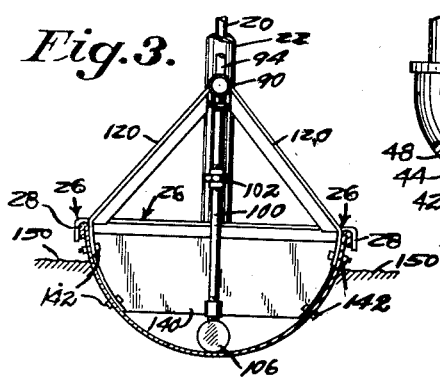
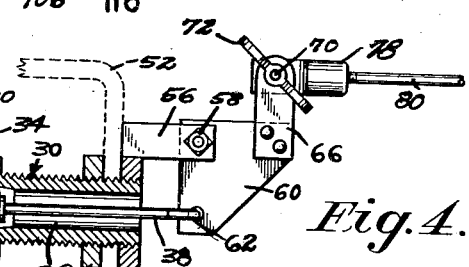
Inventor
Arthur A. Michalek,
By Arthur H. Sturges,
Attorney Patented Mar. 20, 1951

2,545,967

UNITED STATES PATENT OFFICE 2,545,967

HOG WATERING TROUGH

Arthur A. Mickalek, Clear Lake, Iowa

Application January 6, 1949, Serial No. 69,487

1 Claim. (Cl. 219—38)

This invention relates to hog watering troughs and more particularly to troughs having heating means for preventing the freezing over of the drinking water therein.

In the past it has been common practice to employ hog watering troughs, the water for which was refilled by manual operation of the valve. Such troughs have had the disadvantage that they freeze over frequently in the winter time with ice of such thickness that the stock cannot break it for drinking water. It has therefore been necessary to make frequent trips to such hog troughs to break the ice.

It is therefore an object of this invention to provide a hog watering trough eliminating these disadvantages of the prior art.

Still another advantage of the present invention is to provide a watering trough having an automatic water level valve control for eliminating the necessity of manual valve operation for the refilling of the trough.

Another object of the invention is to provide a hog watering trough having automatic valve means as above described and further provided with a shield or guard for preventing the stock from injuring the valve mechanism.

Still a further object of the invention is to provide a hog watering trough with a guard as described which is removable to permit repairs on the valve mechanism thereof.

Another object of the invention is to provide a hog watering trough having one or more heating elements therein.

Yet a further object of the invention is to provide a hog watering trough having heating elements and being provided with means for preventing stock from climbing into the tank and injuring the heating elements by tramping thereon with their feet.

Still a further object of the invention is to provide a hog watering trough as described which is of economical construction.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 1 is a side elevation of the hog watering trough of this invention, portions thereof being broken away and showing the interior thereof.

Figure 2 is a view similar to Figure 1, but with a half portion of the trough broken away for showing the interior thereof, the pipe insulation thereof being broken away and shown in cross-section, and a portion of one of the heating elements thereof being broken away for showing the interior thereof.

Figure 3 is a view-in-section taken along the line 3—3 of Figure 1; and

Figure 4 is a detailed side elevation of the valve mechanism of the invention, the ball portion thereof being broken away, a mid-portion thereof also being broken away and partly shown in section, and supporting brackets therefor being partially shown in dotted lines.

The hog watering trough of this invention includes the tank portion generally indicated at 10. The tank portion 10 is preferably of a semi-circular shape in cross-section and is elongated, having end portions 12 and 14.

The trough 10 is normally disposed with its open side upward and is provided with folded upper edges 14 for preventing injury to stock.

The trough 10 is provided with a water inlet pipe 20 adjacent one end thereof and extending downwardly thereinto. The pipe 20 is provided with insulation 22 extending thereabout and downwardly through an opening 24 in a valve guard or shield 26. The valve shield 26 is for protecting a float valve later described, and is provided with a flat top portion and flanged edge portions 28, which latter overlap the sides of the trough 10.

The guard 26 is held in place by the flanges 28 and because the guard is disposed with the pipe 20 extending through the aperture 24. As thus described, it will be seen that at times when it is desired to repair the later described float mechanism, the guard 26 may be raised upon the pipe 20 and the insulation 22 to a position permitting easy access to the valve mechanism.

The said valve mechanism is best shown in Figure 4 and includes a valve seat member 30 which is threadedly secured at one end to the pipe 20 by means of a coupling 34.

The valve seat member is provided with a bore 36 to which latter a valve stem 38 is slideably disposed. One end of the bore 36 is provided with outwardly flaring wall 40 of gradually increasing diameter as the end 42 of the member 30 is approached. The valve stem 38 is provided with a blocking member 44 having a circular cross-section of gradually lessening diameter as the distance from the corresponding end of the stem 38 is increased.

As thus described, the exterior of the blocking member 44 is complemental to the inclined wall 40 of the left-hand end of the bore 36. The member 44 is secured by means of a nut 48 to the stem 38 in such a manner that at times when the stem 38 is disposed to the right, the member 34 will be caused to block the entrance to the bore 36.

The valve mechanism further comprises a pair of nuts 50 which are respectively disposed on each side of a mounting bracket 52, which latter extends around the member 30 and is held securely between the nuts 50. Another end of the bracket 52 is secured to an end wall 12 of the trough 10.

A connecting member 56 is suitably secured to the bracket 52 and extends away from the member 30 at the opposite end thereof from the inclined walls 40. The connecting member 56 is pivotally secured by means of a bolt 58 to a swingable bell crank or pivot member 60, which latter is preferably of a triangular shape, being secured at one corner to the bolt 58, at another corner to the opposite end of the stem 38, at a hole 62; and being secured at its third corner to an arm 66 which latter is secured to, and extends upwardly from the pivot 60.

The arm 66 is provided at its upper end with an aperture for receiving a bolt 70, which latter is provided with a wing nut 72. The bolt 70 and the wing nut 72 are for the purpose of securing an end member 78 of a float arm 80 to the arm 66.

The float arm 80 is elongated and extends away from the member 66 in a direction normally in approximate parallelism with respect to the valve stem 38, the other end of the valve stem 80 being provided with a float 84 which is adapted to float upon the top of the water 86 in the trough.

As thus described, it will be seen that the construction is such that when the water 86 becomes lowered, the float 84 will be lowered causing the rocker member 60 to pivot in a clockwise direction, as shown in Figures 2 and 4, consequently causing the valve block member 44 to move to the left permitting water to enter the tank 10 through the bore 36.

At times when the wing nut 72 is tightly secured, the arm 80 will be rigidly attached to the member 60. At times it may be desired to change the operating level of the water in the tank and this is accomplished by releasing the nut 72, adjusting the float 84, and tightening the nut 72 for holding the float in a desired position.

The hog watering trough further includes an elongated main electrical conduit or header 90 which is preferably disposed spaced apart from the trough 10 and extending thereabove. The conduit 90 is disposed in longitudinal parallelism with the trough 10 and extending down the middle of the trough 10.

The main conduit 90 is attached by couplings 92 to an inlet conduit 94, which latter is provided with two electrical wires 96 leading to a conventional house-wiring circuit.

The main conduit 90 is provided with a plurality of vertically disposed tubes providing branch conduits 100 which latter may each be composed of several separate sections interconnected by couplings 102, the lowermost section of each of the branches 100 is secured by suitable couplings to the housing 106 of heating elements 110.

The heating elements 110 are disposed one each in the housings 106 and are provided with wires 112 which extend upwardly through the branch conduit 100 and which are connected to the lead-in wires 96.

The main conduit 90 is supported by framework members 120, which latter are disposed in pairs, the pairs being in longitudinally spaced apart positions along the conduit 90.

The two members of each of the said pairs are disposed in a V-shape with respect to each other, inclined from the upper inner ends of the trough 10 toward the main conduit 90. The standards 120 are bolted, as at 122, to the tank 10 and are welded or otherwise suitably secured to the conduit 90.

The construction is such that a pair of the framework members 120 is disposed one member thereof on each side of the branch conduits 100 for protecting the same from hogs.

Also, it will be seen that the spacing of the members 120 should be such that a hog of a size sufficient for damaging the heating element housing 110 cannot force himself between the framework members 120.

The trough is further provided with a protecting baffle 140, which latter extends transversely of the trough and is of a width for extending upwardly and downwardly adjacent the top of the trough to a point beneath the normal water level thereof. The baffle 140 is secured in this position by a plurality of bolts 142. The purpose of the baffle 140 is to protect the valve mechanism from the hogs.

This invention has provided a hog watering trough which is fully automatic, not requiring manual operation for filling the water, and which is provided with heating elements for automatically maintaining the water therein at a temperature such that ice cannot form thereon and at a temperature palatable to hogs. This invention has further provided a hog watering trough, the heating elements of which are protected by the framework thereof.

From the foregoing description it is thought to be obvious that a hog watering trough constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as claimed.

I claim:

In a stock watering trough, the combination which comprises an elongated watering trough, semi-circular in cross section, a longitudinally disposed pipe providing a header spaced above the trough and positioned on the longitudinal center thereof, an electrical supply conduit in said header, a plurality of spaced individual housings in the lower part of the trough and also positioned on the longitudinal center thereof, spaced vertically disposed tubes connecting the said housings to the header above the trough, electric heating elements in each of said housings, electrical conduits connecting the said heating elements to the supply conduit in the header through the said vertically disposed tubes, and inwardly sloping standards extended from the upper edges of the sides of the trough to the said header for supporting the header from the trough, said standards being on opposite sides of the said vertically disposed tubes and positioned in planes extended through the said tubes and located transversely of the said trough whereby the said vertically disposed tubes are protected by the standards from stock watering at the trough.

ARTHUR A. MICKALEK.

REFERENCES CITED

The following references are of record in the file of this patent:

UNITED STATES PATENTS

| Number | Name | Date |
|---|---|---|
| 913,554 | Parton | Feb. 23, 1909 |
| 1,208,513 | Derry | Dec. 12, 1916 |
| 2,126,657 | Petersen | Aug. 9, 1938 |
| 2,133,388 | Henderson | Oct. 18, 1938 |
| 2,230,085 | Ortgiesen | Jan. 28, 1941 |
| 2,297,030 | Snyder | Sept. 29, 1942 |
| 2,511,721 | Langenbahn | June 13, 1950 |